H. Z. COBB.
MANDREL FOR VULCANIZING TIRE SHOES.
APPLICATION FILED JULY 3, 1914.
1,249,033.
Patented Dec. 4, 1917.
2 SHEETS—SHEET 1.
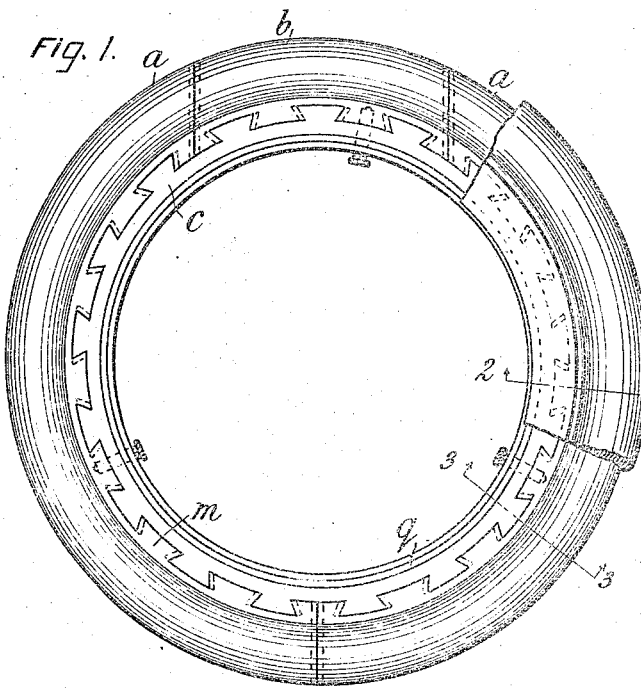
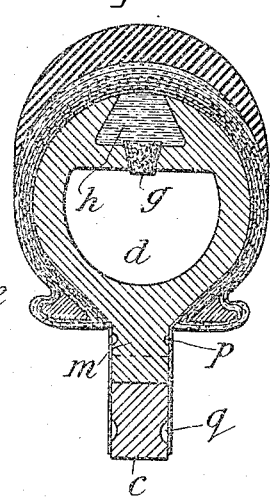
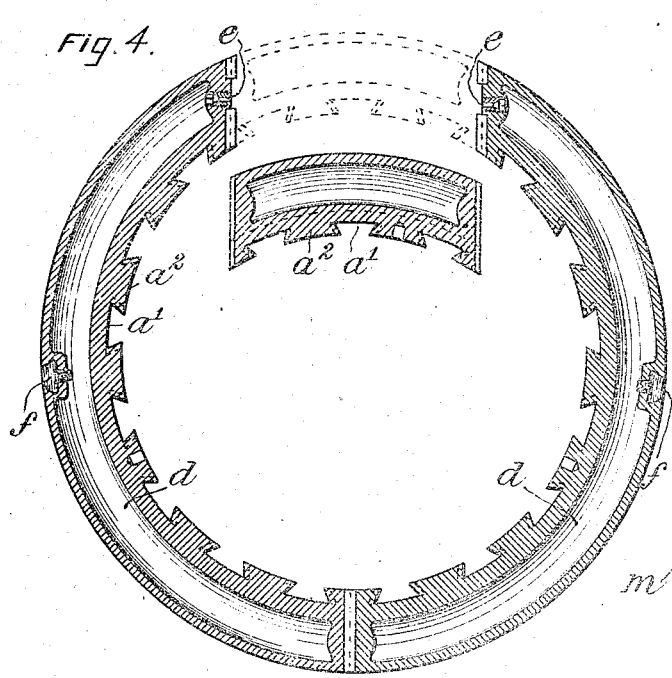
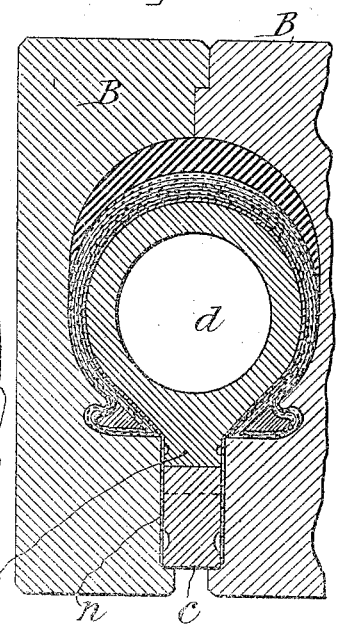
Witnesses:
Inventor:
Henry Z. Cobb
by Fraser, Dunk & Myers
Attorneys.

H. Z. COBB.
MANDREL FOR VULCANIZING TIRE SHOES.
APPLICATION FILED JULY 3, 1914.
1,249,033.
Patented Dec. 4, 1917.
2 SHEETS—SHEET 2.
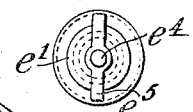
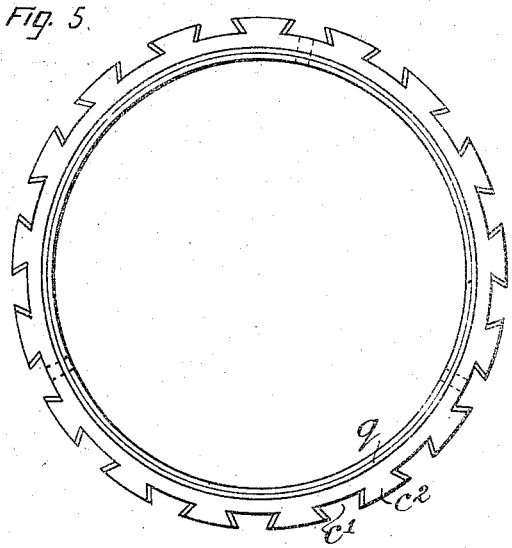
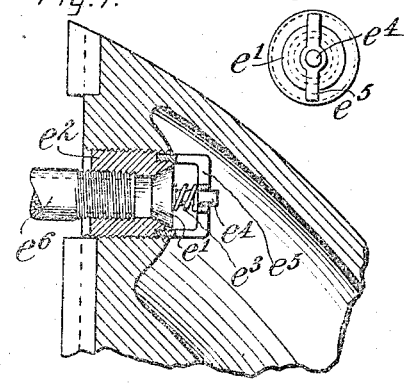
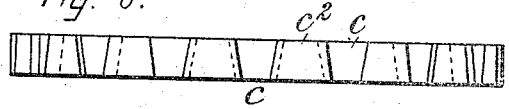
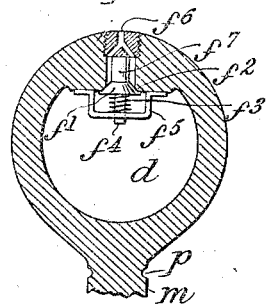
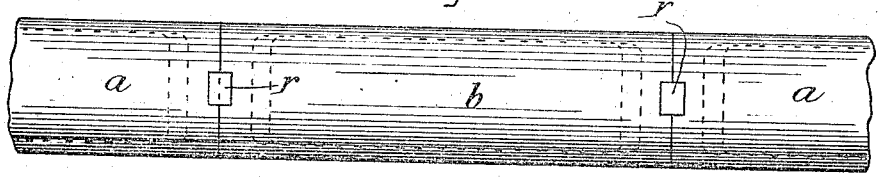
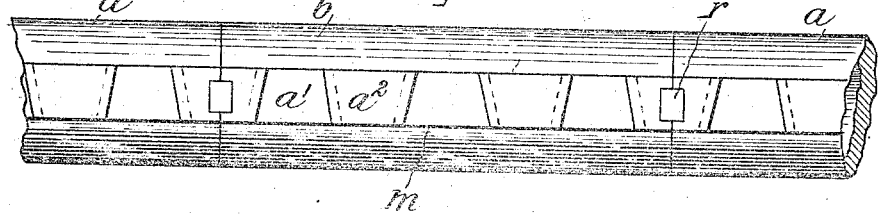
Witnesses.
René Muine
L. L. Wallach
Inventor:
Henry Z. Cobb.
by Thacher, Durk & Myers
Attorneys.

UNITED STATES PATENT OFFICE.

HENRY Z. COBB, OF WINCHESTER, MASSACHUSETTS, ASSIGNOR, BY DIRECT AND MESNE ASSIGNMENTS, TO UNITED STATES RUBBER COMPANY, OF NEW BRUNSWICK, NEW JERSEY, A CORPORATION OF NEW JERSEY.

MANDREL FOR VULCANIZING TIRE-SHOES.

1,249,033.  Specification of Letters Patent.  Patented Dec. 4, 1917.

Application filed July 3, 1914. Serial No. 848,767.

*To all whom it may concern:*

Be it known that I, HENRY Z. COBB, a citizen of the United States, residing in Winchester, in the county of Middlesex and State of Massachusetts, have invented certain new and useful Improvements in Mandrels for Vulcanizing Tire-Shoes, of which the following is a specification.

This invention relates to the manufacture of tire shoes or casings for pneumatic vehicle tires, and has for an object to provide a fluid pressure chamber within the mandrel, the pressure of which is thermostatically released to the interior of the shoe upon the mold, and also provides a sectional or segmental mandrel provided with means for precisionizing and locking the sections in position, which mandrel is readily assembled prior to the application of the shoe thereon and may be readily disassembled preliminary to its removal from the finished shoe.

In the manufacture of shoes or casings for pneumatic vehicle tires, it is customary to build up the successive layers thereof on a ring-shaped core or mandrel to which on the exterior the rubber cushion is applied, and then to place the mandrel with its raw shoe in a mold, assembling a series of such molds held together under suitable pressure in a vulcanizing oven, and therein subjecting them to heat for vulcanizing the tire shoes. In this operation it is difficult to insure so close a fit between the raw shoe and the material of the mold as to cause the shoe to completely fill all the interstices of the mold and take a full imprint therefrom. In order to expand the shoe forcibly within the mold, fluid pressure has been introduced into it and maintained during the vulcanizing; this, however, is subject to the disadvantage that it is necessary to couple pipes leading from a source of compressed air to the respective mandrels or mold sections, and to maintain these pipes and couplings in non-leaking condition during the vulcanizing period, which in practice involves much difficulty.

My present invention provides for expanding the tire shoe into the mold by fluid pressure in the form of gas or vapor which is admitted from a suitable chamber to the interior of the shoe to press the latter outwardly into intimate contact with the mold. Thus instead of having a source of pressure which is connected through coupling means to the respective mandrels or mold sections, each mandrel is provided with its own source of fluid pressure. For this purpose each mandrel is provided with an individual chamber in which the source of fluid pressure for its own shoe is stored. This pressure is admitted from such source to the interior of the shoe after the mold is united and before the temperature has risen sufficiently high to so far vulcanize the rubber that the latter loses its plasticity. In ordinary practice such admission of pressure to the shoe is accomplished after the molds in one vulcanizing chamber have been put in place and clamped together by the usual means, so that a tight joint is made between the shoes and the molds. The admission of the pressure to the shoe is best determined thermostatically. The gas or vapor under pressure is of determinate volume depending upon the charge previously introduced into the chamber. The chamber is preferably a hollow in the mandrel. Preferably air is forced into the chamber to a given pressure, being confined therein until liberated by the action of the thermostatic means, which is a thermostatically actuated valve or a fuse plug. Or a vaporizable liquid such as water may be introduced in measured volume into the chamber, so that on the opening of the thermostatic plug or valve the vulcanizing heat will vaporize the water and generate the required pressure within the shoe.

In the drawings accompanying this specification a practicable embodiment of the invention is illustrated, in which drawings—

Figure 1 represents a side elevation of my improved mandrel, a portion of the broken-away tire being shown mounted upon the mandrel.

Fig. 2 is a larger cross-section taken on a plane at about the line 2—2 of Fig. 1.

Fig. 3 is a similar cross-section of the mandrel taken on a plane at about the line 3—3 of Fig and also represents a cross-section of a shoe in position on the mandrel, and a cross-section of a mold investing the whole.

Fig. 4 is a central section of the segments of the mandrel, the retaining ring having been removed therefrom, one of the segments, the key segment, being shown displaced from the others.

Fig. 5 is a side elevation of the ring.

Fig. 6 is an edge view thereof.

Fig. 7 is an enlarged sectional detail of the end of one of the segments, illustrating the admission valve for the compressed fluid therein.

Fig. 8 is an end view of the admission valve.

Fig. 9 is an enlarged edge view of the mandrel, viewing the same from the outer edge.

Fig. 10 is a similar view, looking at the inner edge, the ring being removed.

Fig. 11 is a cross-section of the mandrel, illustrating a form of thermostatic valve.

The mandrel is shown made up of hollow segmental sections $a$ $a$ and a short segmental section $b$, the section $b$ acting in the nature of a key for holding the other sections in position. The sections $a$ $a$ and $b$ are shown united by a ring $c$ within them having some suitable means for attachment therewith. In the present illustration the segments are shown provided with tapering dove-tailed grooves and projections $a'$ $a^2$, and the ring is shown provided with tapering dove-tailed grooves and projections $c'$ $c^2$. The dove-tails serve the purpose of securing the segments together, and of positioning and precisionizing the entire mandrel. Each segment $a$ being made hollow has a chamber $d$ within it. An inlet check valve $e$ of some suitable construction is applied through which to force air or other gas into the chamber $d$. This valve may be of any usual construction of tire valve, a simple form being that illustrated. The tapering valve $e'$ is shown seating in a plug $e^2$, pressed to its seat by means of a spring $e^3$, surrounding the valve stem $e^4$ which is guided by the yoke $e^5$. An inlet pipe $e^6$ is shown temporarily connected to the plug $e^2$ for supplying fluid under pressure from some suitable source not shown.

Each segment $a$ has a thermostatic outlet valve $f$ preferably of the simple construction illustrated in Figs. 2 and 4, wherein a cork $g$ which may be of rubber is forced tightly into a hole, and a dove-tailed chamber above it is filled with molten paraffin or other wax to form a fusible plug $h$. Another form of valve is illustrated in Fig. 11, wherein the valve $f'$ is shown of conical formation and pressed toward its seat $f^2$ by means of a coiled spring $f^3$ surrounding the valve stem $f^4$ and engaging the yoke $f^5$. The outer portion of the outlet from the hollow chamber $d$ to this is closed by means of a plug $f^6$ having suitable air passages through it. The end of the valve $f'$ is shown carrying a plug $f^7$ of some expansible material, preferably copper, which engages the plug $f^6$. The expansion of the plug $f^7$ will unseat the valve and permit the fluid under pressure in the chamber $d$ to escape past the valve and valve seat.

The mold B is shown of usual construction, being of annular form and divided centrally so as to form equal halves as shown in Fig. 3.

As best shown in Fig. 2 the mandrel has an annular neck portion or inner flange $m$ presenting flat faces on opposite sides flush with the flat side faces of the ring $c$. The mold being correspondingly shaped, it is only necessary to extend the inner lining $n$ of the shoe which is of soft rubber inwardly to cover these flat faces, in order thereby to utilize this lining as a packing for making a tight joint between the mold and the mandrel when the faces of the mold are clamped tightly together by the usual means (not shown). To give further assurance of making an air-tight fit, the neck portion $m$ and the ring $c$ (or either of them) are formed with one or more annular grooves $p$ $q$, as best shown in Fig. 2, into which grooves the soft rubber of this lining enters under heat and pressure and affords an effectual seal against the escape of the air or other fluid.

The described method of manufacturing tire shoes is set forth in detail in a companion application which illustrates and describes the mandrel made the subject of the present application.

In using the improved mandrel the segmental sections $a$ $a$ $b$ are placed in proper position. They may be held in alinement by means of suitable keys $r$ $r$. The sections, of course, are to be united after the fluid within the chamber $d$ has been brought to the proper stage of compression, if the compression valves are located at points which are inaccessible after assemblage, as in the present illustration. It is advantageous to have the admission valves so located to prevent accidental unseating of the valves. After the segments have been properly brought together, the ring $c$ will be forced into position, and by means of the tapering dove-tails the segments will be positioned and locked and securely held in position. After this the shoe will be built up in any approved manner. This is then placed in a mold which is shaped interiorly to give the proper form and pattern to the exterior of the shoe. The segments of the mold are held together in some suitable manner. The thermostatic valve is preferably adapted to open under a temperature for example of 140°. The molds are placed in some suitable vulcanizing oven or chamber, and this is heated up to the customary vulcanizing temperature and the vulcanizing operation is conducted in precisely the ordinary manner. On reaching the prescribed temperature the thermostatic valves in the mandrel sections open and permit the compressed air to blow out from the chambers into the shoe, thereby lifting the shoe away from the mandrel, and expanding it outwardly against the inner face of the mold and holding it there during the vulcanizing operation. An air-tight joint is assured by the usual inner lining of soft rubber extending between the inner part or neck of the mandrel and the corresponding faces of the mold, so that this forms a packing to seal the joint between these respective faces and thereby prevent escape of the compressed air.

Instead of using air or other fixed gas, vapor may be provided by introducing into the chamber $d$ a quantity of water or other vaporizable liquid, choosing a liquid the vapor of which will not affect the rubber of the tire shoe. A predetermined quantity of liquid will be introduced such that under the vulcanizing temperature the vapor tension will afford the required pressure.

It will be apparent that changes in details of construction may be made within the terms of the claims without departing from the spirit of the invention.

I claim as my invention:—

1. A tire shoe mandrel comprising a plurality of segments, and a ring within them for holding them in proper relative positions, the abutting approximately cylindrical surfaces of the ring and segments being varied to form dove-tails extending across the plane of the mandrel.

2. A tire shoe mandrel comprising a plurality of segments provided on their inner faces with tapering dove-tails, and a ring for holding said segments in proper relative positions and provided on its periphery with tapering dove-tails mating with those on said segments, said dove-tails extending across the plane of the mandrel and tapered to tighten as the ring is moved toward such plane.

3. A tire shoe mandrel comprising a plurality of segments, keys for alining the segments at their abutting ends, and a ring located within said segments, there being mating dove-tails transverse to the plane of the ring formed on the segments and ring.

4. A tire shoe mandrel comprising a hollow body having formed within it a chamber adapted to receive and confine a charge of fluid, and having an admission valve to such chamber, and a thermostatic discharge valve opening from such chamber.

5. A mandrel comprising a plurality of connected segments, some of said segments being hollow bodies, each of which comprises a chamber adapted to contain a charge of fluid under pressure, an admission valve to such chamber, a discharge valve from such chamber, and thermostatic means for controlling said discharge valve.

6. A mandrel comprising a pair of hollow segments, each having within it a chamber for receiving a charge of fluid under pressure, said segments abutting each other at one end, a key segment located between the said segments and abutting the free ends thereof, an admission valve in the free end of each such segment, and a discharge valve in the mandrel face of each said segment.

7. A mandrel comprising a pair of hollow segments, each having within it a chamber for receiving a charge of fluid under pressure, said segments abutting each other at one end, a key segment located between the said segments and abutting the free ends thereof, an admission valve in the free end of each such segment, a discharge valve in the mandrel face of each said segment, and thermostatic means for controlling said discharge valves.

8. A tire shoe mandrel comprising a plurality of segments, and a ring within them for holding the segments in proper relative positions, the segments having an inner neck portion abutting said ring and flush therewith to form therewith a packing surface and a mold having a conforming surface between which and such packing surface to confine a packing.

9. A tire shoe mandrel comprising a plurality of segments, and a ring within them for holding the segments in proper relative positions, the segments having an inner neck portion abutting said ring to form therewith a packing surface, and having grooves in said packing surface.

10. A mandrel formed with a chamber adapted to confine fluid under pressure, such chamber having a thermostatic closure adapted to open and liberate the confined fluid under vulcanizing conditions.

11. A mandrel formed with an individual chamber adapted to confine a source of fluid pressure suitable for expanding within the mold only the one tire shoe to be vulcanized on such mandrel, and having means adapted to liberate the confined fluid to the interior of the shoe while the shoe is confined in the mold.

12. A tire shoe mandrel formed with an individual chamber adapted to confine a source of fluid pressure sufficient for expanding within the mold only the one tire shoe on such mandrel, such chamber communicating with the face of the mandrel to discharge such fluid within the shoe, and having means adapted to liberate the confined fluid during the vulcanizing operation.

13. A tire shoe mandrel comprising a plurality of connected segments, one of said segments having formed therein a chamber adapted to confine a fluid under pressure sufficient to expand within the mold the one tire shoe on such mandrel, and having means adapted to liberate such confined fluid during the vulcanizing operation.

In witness whereof, I have hereunto signed my name in the presence of two subscribing witnesses.

HENRY Z. COBB.

Witnesses:
B. L. MARTIN,
A. T. MARTIN.

Copies of this patent may be obtained for five cents each, by addressing the "Commissioner of Patents, Washington, D. C."